US 12,109,518 B2

(12) United States Patent
Wetter et al.

(10) Patent No.: US 12,109,518 B2
(45) Date of Patent: Oct. 8, 2024

(54) DEVICE FOR SEPARATING SOLID MATERIALS FROM LIQUIDS AND GASES

(71) Applicant: DrM, Dr. Müller AG, Männedorf (CH)

(72) Inventors: Kevin Wetter, Teufen (CH); Patrick Müller, Meilen (CH)

(73) Assignee: DRM, DR. MÜLLER AG, Männedorf (CH)

( * ) Notice: Subject to any disclaimer, the term of this patent is extended or adjusted under 35 U.S.C. 154(b) by 929 days.

(21) Appl. No.: 17/260,176

(22) PCT Filed: Jul. 3, 2019

(86) PCT No.: PCT/IB2019/055670
§ 371 (c)(1),
(2) Date: Aug. 26, 2021

(87) PCT Pub. No.: WO2020/021363
PCT Pub. Date: Jan. 30, 2020

(65) Prior Publication Data
US 2022/0008846 A1 Jan. 13, 2022

(30) Foreign Application Priority Data
Jul. 23, 2018 (CH) .................................. 0090218A

(51) Int. Cl.
*B01D 29/94* (2006.01)
*B01D 29/05* (2006.01)
(Continued)

(52) U.S. Cl.
CPC ............. *B01D 29/94* (2013.01); *B01D 29/05* (2013.01); *B01D 29/15* (2013.01); *B01D 29/52* (2013.01);
(Continued)

(58) Field of Classification Search
CPC ........ B01D 29/94; B01D 29/05; B01D 29/15; B01D 29/52; B01D 29/66; B01D 29/90;
(Continued)

(56) References Cited

U.S. PATENT DOCUMENTS 1,721,250 A 7/1929 Greenhalgh
5,364,528 A * 11/1994 Schwarz .............. B01D 29/114
210/453
(Continued)

FOREIGN PATENT DOCUMENTS

DE 9307195 U1 7/1993
KR 20140051911 A 5/2014

OTHER PUBLICATIONS

English translation of International Search Report and Written Opinion dated Nov. 14, 2019 in corresponding International Patent Application No. PCT/IB2019/055670.
(Continued)

*Primary Examiner* — Madeline Gonzalez
(74) *Attorney, Agent, or Firm* — Lathrop GPM LLP; Tucker Griffith

(57) ABSTRACT

The invention relates to a device for separating solid materials out of liquids or gases and for discharging solid material. The device comprises a pressurised container and at least one filter element, the at least one filter element being arranged in a flexible container which is arranged in the pressurised container and is sealed tightly relative thereto. The pressurised container comprises at least one outlet for discharging the solid material and the flexible container comprises at least one discharge connection, the discharge connection of the flexible container being guided through the outlet of the pressurised container and sealed tightly relative to the pressurised container. In this case the outlet and the discharge connection of the flexible container can be closed and sealed by means of a closure mechanism relative
(Continued)

to the environment outside the flexible container and the pressurised container.

18 Claims, 14 Drawing Sheets

(51) Int. Cl.
      *B01D 29/15*     (2006.01)
      *B01D 29/52*     (2006.01)
      *B01D 29/66*     (2006.01)
      *B01D 29/90*     (2006.01)
      *B01D 29/92*     (2006.01)
      *B01D 35/153*    (2006.01)
      *B01D 35/16*     (2006.01)

(52) U.S. Cl.
      CPC .............. *B01D 29/66* (2013.01); *B01D 29/90* (2013.01); *B01D 29/92* (2013.01); *B01D 35/153* (2013.01); *B01D 35/16* (2013.01); *B01D 2201/0484* (2013.01); *B01D 2201/307* (2013.01)

(58) Field of Classification Search
      CPC ...... B01D 29/92; B01D 35/153; B01D 35/16; B01D 2201/0484; B01D 2201/307; B01D 29/822; B01D 2201/16
      USPC .... 210/791, 221.2, 3, 321.8, 321.89, 6–412, 210/416.1, 440–444, 451, 455, 458, 486
      See application file for complete search history.

(56) References Cited

U.S. PATENT DOCUMENTS

2010/0264100 A1    10/2010   Rivera et al.
2013/0209320 A1*   8/2013    McAlister ............ B03C 1/0332
                                                               96/2
2015/0129510 A1*   5/2015    Johnson ................ B01D 35/30
                                                               210/436

OTHER PUBLICATIONS

Korean Application No. 10-2021-7002082, Request for the Submission of an Opinion, dated Jan. 17, 2023, 12 pages.

\* cited by examiner

DEVICE FOR SEPARATING SOLID MATERIALS FROM LIQUIDS AND GASES

CROSS-REFERENCE TO RELATED APPLICATIONS

This application is a National Stage application of International Patent Application No. PCT/IB2019/055670, filed on Jul. 3, 2019, which claims priority to Swiss Patent Application No. 9022018A, filed Jul. 23, 2018, each of which is hereby incorporated by reference in its entirety.

TECHNICAL FIELD OF THE INVENTION

The invention relates to a device for separating solid materials from liquids and gases and for subsequent discharge of solid materials, consisting of a pressure vessel, one or more filter elements in a flexible container, e.g. of film or flexible plastic, and a discharge mechanism, and its application.

Numerous filtration systems with flexible containers are known, which are usually classified under the terms "disposable system" or "single-use". Advantages of such systems are the sterility of the disposable components, smaller investment costs and the reduced cleaning and validation costs of the stainless steel support and pressure vessels, no contamination risk between two product cycles, as well as the high flexibility and speed of product changes.

BACKGROUND OF THE INVENTION

EP 2283907A1 describes a device for the filtration of liquids with a filter element in the form of a cartridge, which is tightly wrapped with a plastic film and operated in a pressure vessel. The solid matter is absorbed in the cartridge during filtration and cannot be removed or removed from the flexible container. Due to the limited size of the filtration area, this type of filtration is used for suspensions with a low solids content.

In WO2012/007222A1 a filter module for single use is described, consisting of preferably horizontally positioned disc-shaped filter elements, which are tightly wrapped in a flexible, stretchable cover. For operation, the unit is placed in a positioning frame, which supports the flexible cover during its expansion by an attached internal pressure in the unfiltrate chamber and limits its expansion. It is not possible to squeeze out the flexible container by applying a pressure, only a withdrawal by means of vacuum is possible. In addition, the geometric expansion of the disc-shaped plates means that the filter surfaces can only be rinsed to a limited extent and solid materials cannot be discharged.

DE 3807828 discloses a device for the filtration of liquids within a closed container having a multi-piece welded cover of thermoplastic resin and a film tube with filter cartridges disposed therein. The cover and the filter cartridges are connected by a thread. A film tube can be installed in a cup and sealed from the environment by pressing the cover on, wherein the filter cartridges are disposed inside the flexible film tube. The device offers no solution for residual volume filtration, solids cleaning, solids drying or solids discharge. There are also no connections provided for the discharge of concentrated or dry solids.

The illustrated solutions according to the prior art allow the separation of solid materials from liquids and gases in a sterile area separated from the environment by a flexible partition wall. There is no actual discharge and the cleaning and recovery of the solid materials is not intended. Frequently, the flexible containers are cut open after use to discharge the solid materials. This has the disadvantage that the solid matter is contaminated by interrupting the sterility or that it reaches the environment. Furthermore, if the flexible container is destroyed, reuse is no longer possible.

SUMMARY OF THE INVENTION

It is the object of the invention to create a device for separating solid materials from liquids and gases which eliminates the aforementioned disadvantages and provides a simplified filtration system which is reusable and which makes it possible to separate solid materials from liquids and gases within a flexible container under sterile conditions and in an area sealed from the environment, to optionally wash and dehumidify said solid materials and then to discharge them from the device. An advantage of a discharge of solid materials is that the filtration area is kept free and the filtration container is regenerated, which makes it possible to operate the filtration again in the same filtration container.

Such devices are used, for example, in the food industry or in the biopharmaceutical industry.

DESCRIPTION OF THE INVENTION

A device for the separation of solid particles from liquids and gases is disclosed with a pressure vessel and with at least one or more filter elements, wherein the filter elements are arranged in a flexible container made of plastic, which is arranged inside the pressure vessel and is sealed tightly against it and the environment outside the pressure vessel. The flexible container is preferably removable from the pressure vessel. In accordance with the invention, the pressure vessel comprises at least one outlet for discharging solid materials and the flexible container comprises at least one discharge connection, wherein the discharge connection of the flexible container is guided through the outlet of the pressure vessel and is sealed tightly relative to the pressure vessel. The outlet of the pressure vessel and the discharge connection of the flexible container can be closed tightly by means of a closure mechanism.

The device according to the invention enables the recovery of a preferably dry solid material, a concentrated solid sludge during filtration processes in flexible containers, as well as the total emptying of the filtration container and the regeneration of the filter surfaces for a renewed use of the filter device.

The outlet for discharging the solid materials is preferably a nozzle, and is located at the container bottom, the container shell or the container lid of the pressure vessel. The nozzle allows guiding a discharge connection, preferably an extension, of the flexible container through the pressure vessel wall and to seal it tightly.

A closure mechanism is located downstream of the outlet or the nozzle for discharging the solid materials.

In a preferred embodiment, the closure mechanism for opening and closing the outlet for discharging the solid materials is a clamping device, preferably a pinch valve. Preferably, the closure mechanism can close the extension of the flexible container or the attached tube without contact. This is particularly advantageous for sterile applications, as no substances inside the flexible container come into contact with the valve. In another embodiment, the closure mechanism comprises a valve, preferably a pressure-operated valve or a manual valve, for example a ball valve, which can be connected to the flexible container. The closure mechanism is used to seal the flexible container against the environment outside the pressure vessel. In one embodiment, the closure mechanism also seals the area between the flexible filtration container and the pressure vessel from the environment.

The discharge connection of the flexible container can be a part or an extension of the flexible container or a tube connected to the flexible container, which can be guided and fixed through the nozzle of the pressure vessel and the closure mechanism.

In a special embodiment, the sealing between the discharge connection of the flexible container and the outlet of the pressure vessel can preferably be achieved by means of a seal. The seal is preferably an O-ring or a flat seal.

Preferably, the outlet for discharging solid materials, the so-called nozzle, and the discharge connection of the flexible container are located in the lower area of the pressure vessel and the flexible container. This enables easy discharge of the sedimented solid materials, which accumulate in the lower area of the container during rinsing by gravity. In another embodiment, the outlet for discharging the solid materials and the discharge connection of the flexible container are located in the lateral or upper area of the pressure vessel and the flexible container. In case of heavily sedimenting solid materials it is advantageous to discharge the solid materials in the lower part of the container. The dimensions of the outlet for discharging the solid materials must be selected in such a way that the discharge of the solid materials is as unhindered as possible. In the case of very dry solid materials, the diameter of the outlet, i.e. the corresponding nozzle and the sealing mechanism, should be selected as large as possible. Preferably, the diameter of the outlet for discharging solid materials should be at least 15 mm, even more preferably at least 20 mm, especially preferably at least 25 mm. In one embodiment, the outlet for discharging solid materials has the same diameter as the pressure vessel, especially as the container shell of the pressure vessel. In this embodiment, the outlet for discharging solid materials is located in the lower area of the pressure vessel, and the entire bottom of the pressure vessel is replaced by a closure mechanism.

Preferably, the one or more filter elements are suspended in the pressure vessel.

In one embodiment, several filter elements are each formed in a flat manner and suspended parallel to each other so that a large total filter area per volume is available, which is advantageous for the flow rate and filter efficiency of the device. In addition, the parallel arranged filter elements can be pressed together. For this purpose, they are connected to each other to form a filter package of a large number of filter elements, wherein there is a predetermined free space between the individual filter elements over a large part of their vertical longitudinal extension.

In a further embodiment, at least one filter element is designed in a round manner. The term round means that the diameter is round perpendicular to the longitudinal direction of the filter element. For example, in this embodiment the at least one filter element is formed in a tubular manner. In a further embodiment, the at least one filter element is formed in a disc-shaped manner. Disc-shaped means that the at least one filter element has the shape of a flat disc and can be stacked on top of each other or arranged suspended in parallel.

The filter package, consisting of a large number of flat, round or tubular filter elements arranged in parallel, can be compressed due to the free space between the filter elements and the viscoplastic properties of the plastic used for the inner container. The resulting flexibility of the filter package thus offers advantages when emptying the filtration container, for example during residual volume filtration or solid materials discharge, as the container can be compressed to a greater extent. The flexibility and compactness of the filter elements also improve the residual volume discharge and reduce the raw material content.

The actual flexible container consists of a flexible plastic in which the one or more filter elements are arranged. The filtration process takes place completely in the delimited, sealed space of the flexible inner container, wherein the liquids and gases to be treated only come into contact with the plastic of the inner flexible container. This has significant advantages in handling aggressive media and process sterility.

Preferably, the inner, flexible container with the filter elements can be removed from the pressure vessel as a whole without the gases or the liquid coming into contact with the pressure vessel. This allows the device to offer a disposable system. This eliminates the need for time-consuming cleaning and sterilisation of the device. However, the present invention also makes a reusable system possible, in that the solid material can be flushed through with flushing liquid or gases, rinsed from the filter elements and then discharged from the device. Thus, the device can be used several times for the same suspension and the flexible container does not have to be removed from the pressure vessel after each passage.

The flexible inner container with the filter elements, the actual filtration container, is made entirely of plastic, preferably of a viscoplastic material, can be folded compactly and stored and can be recycled after use or disposed of completely by incineration. The outer pressure vessel is used to provide stability to the system and to provide the necessary pressure drop for the pre-, main and residual volume filtration.

Appropriate nozzles on the pressure vessel allow the passage of inlet and outlet connections on the flexible container for filling and emptying. These connections are each sealed in such a way that there is also a sealed zone inside the pressure vessel, between the inner wall of the pressure vessel and the outer wall of the flexible container, which can be filled with overpressure or a vacuum. For this purpose, there are additional nozzles on the pressure vessel.

The device according to the invention can be realised in different variants, wherein these differ mainly in the arrangement of the connections and the closure mechanism. Depending on the application, it is advantageous if the inlets and outlets, also called nozzles, can be arranged in the upper, lateral or lower area of the pressure vessel. These inlets and outlets on the pressure vessel allow inlet and outlet connections to be guided through the flexible container in order to fill and empty it with a suspension, rinsing liquid or gases, or to allow the filtrate to drain off. These connections are each sealed so that there is also a sealed zone inside the pressure vessel, between the inner wall of the pressure vessel and the outer wall of the flexible container, which can be filled with overpressure or a vacuum. For this purpose, there are further connections for the compressed air supply on the pressure vessel, which can be defined optionally at the top, at the side or at the bottom, but at least at one position. This offers advantages in terms of process flexibility and the efficiency of filtration and emptying of the container.

The filtration container is manufactured in such a way that it can be mounted in the pressure vessel in a very user-friendly way and can be dismantled after use. In a variant of the invention, the container inlet inside the container can be fitted with a tube made of flexible plastic. This optimises the filling process of the container. For example, the suspension can be introduced with a tube inside the flexible container during filtration without disturbing the build-up of a solid material layer on the filter surfaces or the solid being flushed by the filter elements. In the case of heavily sedimenting solid materials, it can be advantageous to introduce the suspension into the flexible container with the aid of a tube in such a way that the solid material is flushed out, so that it does not sediment and the suspension is mixed as homogeneously as possible. In one variant, one of the innermost ends of the tube is equipped with a nozzle, which can have an advantageous effect on the inflow of the suspension.

In another variant of the invention, the container outlet inside the flexible container is fitted with a tube made of flexible plastic. This enables the discharge of suspension or solid sludge from the inside of the flexible container. Advantages of this arrangement are shown, for example, in case of a blockage of the filter surfaces, wherein the residual suspension must be removed from the interior of the container and discharge through the discharge nozzle is not desired.

In filtration processes, especially in thickening processes, it is often necessary to backwash the filter elements so that the layer of solid particles built up on the filter elements can be rinsed. The arrangement of the majority of flat filter elements enables improved backwashing and detachment of the solid particles from the filter elements. The backwashing of the filter elements can prevent the build-up of a dense layer of solid particles and thus lead to increased filtrate flow.

A well-known problem in filtration processes is the treatment of the residual volume in the filter system. The device according to the invention can reduce the residual volume by using the system in the pressure vessel by compressing the flexible filtration container with an external pressure and thus partially or completely emptying it. This can prevent considerable additional costs, especially with very expensive media. To further improve emptying, the filtration container can also be flushed with gases (e.g. sterile air).

Thanks to the completely sealed, sterile filter elements, the increased filter surface area, the resulting high filtration efficiency, the complete filtration with reduced residual volume components and the simplified discharge of dry solid materials or solid sludge, the device according to the invention enables a cost-effective filtration device with high flow rates, minimised cleaning costs and short changeover times when changing products.

In addition, the present invention comprises an application of the device according to the invention for filtering solid materials from liquids or gases and for discharging the solid from the device.

A method according to the invention for filtering solid materials from liquids or gases and for discharging the solid by means of a device according to the invention comprises the steps
a) Applying a pressure difference between the interior of the flexible container and the filtrate discharge,
b) Filling the flexible container with a suspension or gas,
c) Applying a negative pressure in the filtrate discharge or an overpressure in the flexible container,
d) Pressing out the flexible container,
e) Flushing the solid material with flushing liquids or gases
f) Rinsing the solid material from the filter elements,
g) Opening the closure mechanism and discharging the solid material through the discharge connection of the flexible container at the outlet of the pressure vessel.

The method steps a) to g) can be repeated once or several times.

The filling of the flexible container with a suspension or gas in step b) can be carried out, for example, by a pressure drop generated by a pump or a negative pressure generated between the pressure vessel wall and the flexible container.

Combinations of two or more of the embodiments and variants listed above are conceivable and claimed.

BRIEF DESCRIPTION OF THE DRAWINGS

The invention is described in more detail by means of exemplary embodiments shown in the drawings, wherein.

DESCRIPTION OF THE PREFERRED EMBODIMENTS

Figure 1:
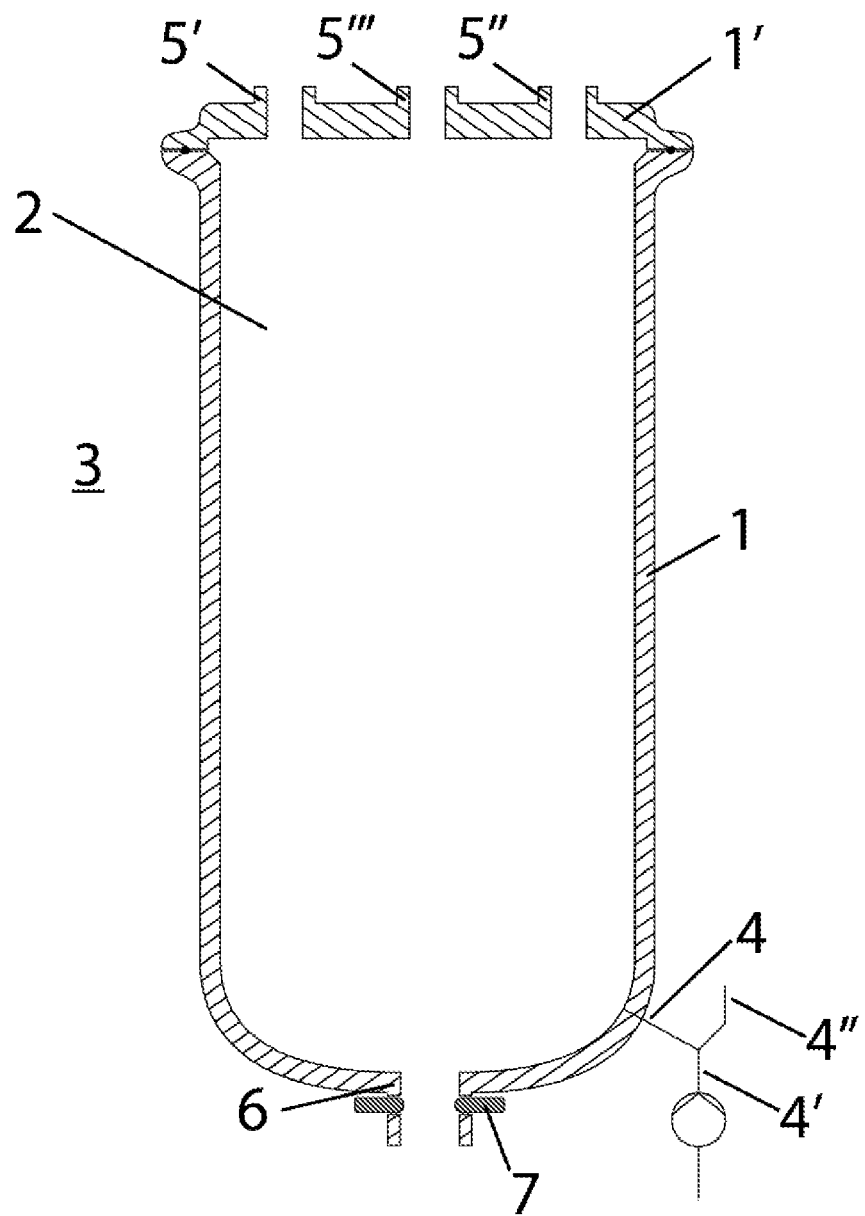
FIG. 1 shows the device with a pressure vessel in a longitudinal section.

In FIG. 1, the reference numeral 1 represents a pressure vessel which can be closed with a lid 1', forming a pressure vessel zone 2 inside the pressure vessel, which is sealed against the external environment 3. At least one nozzle for a pressure line 4 in the container lid or preferably in the container shell of pressure vessel 1 can be used to apply pressure 4' to the inner pressure vessel zone 2 or to vent it with a vacuum 4". In the pressure vessel wall, preferably in the lid 1', there is at least one inlet nozzle 5', one outlet nozzle 5" and one filtrate discharge nozzle 5'" each. A further outlet 6 for discharging solid materials and liquids is preferably located in the lower area of the pressure vessel 1. A sealing mechanism 7 is attached to the discharge outlet 6.

Figure 2:
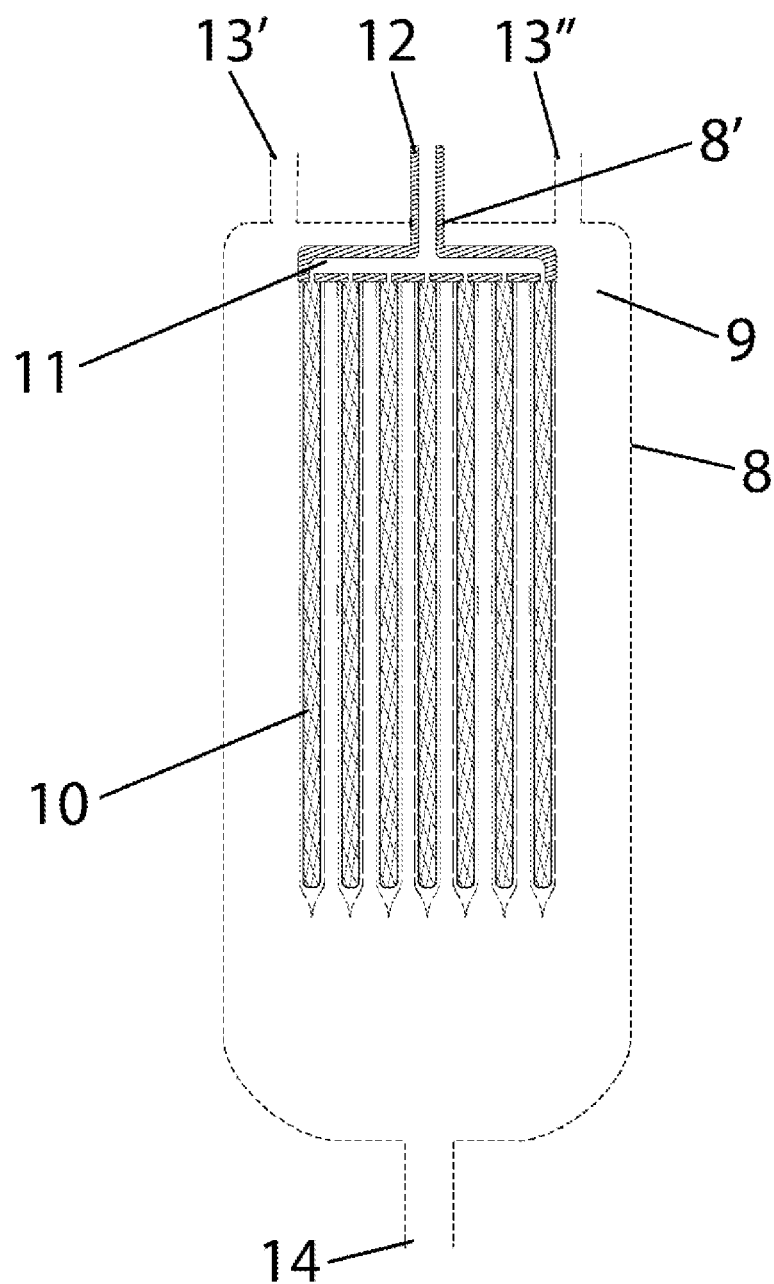
FIG. 2 shows the flexible, inner container of the device in an embodiment with flat, hanging filter elements in longitudinal section during the uninstalled and unfilled state.

FIG. 2 shows a flexible container in its uninstalled and unfilled state. A flexible container wall 8 seals off the inner area, zone 9, from the outer environment. One or more filter elements 10 are arranged inside the flexible container 8. Within these filter elements there are filtrate discharge channels which are connected in a collector piece 11. During filtration, the filtrate flows through the filter channels to the collector piece and is discharged through the connected filtrate discharge connection 12. The filtrate discharge connection 12 leads through the flexible container wall 8 and is connected to it in a sealed manner 8'. The flexible container 8 preferably has at least two further connections 13', 13" in the upper area, which allow the suspension, a rinsing liquid or gases to enter the inner zone 9 or the suspension, a rinsing liquid or gases to leave the inner zone 9. An extension 14 preferably in the lower part of the flexible container 8 is used for discharging solid materials and the discharge of unfiltered suspension from the inner zone 9. This discharge connection 14 can either be an extension of the flexible container 8 or consist of a flexible tube made of film or elastic material connected to the flexible container wall 8.

FIGS. 3-8 show the sub-processes of filling, filtration, residual volume filtration and flushing, backwashing and regeneration of the filter surfaces, solid materials discharge and total emptying, as well as the corresponding implementation of the device. These processes can be carried out in any order, especially repeatedly in several cycles.

Figure 3:
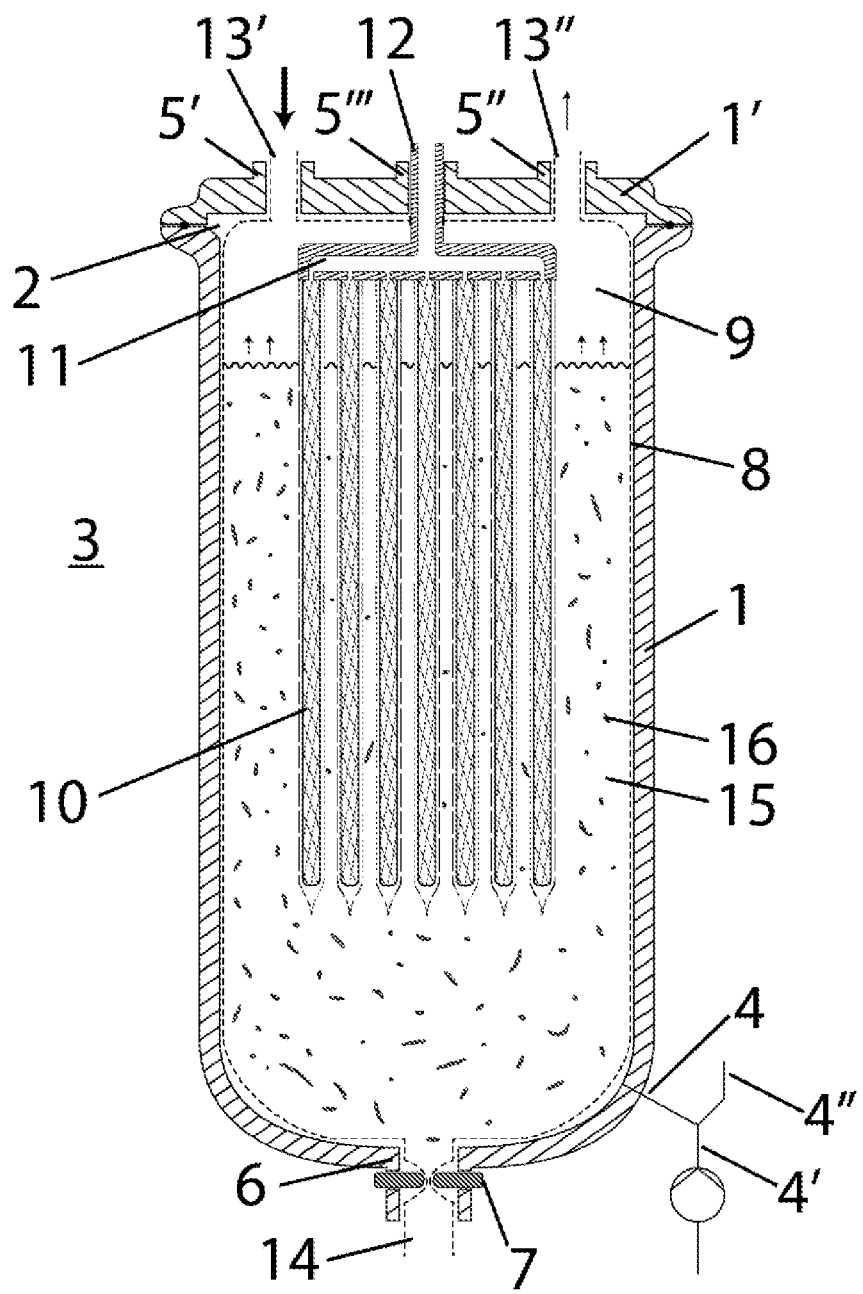
FIG. 3 shows the device with the installed flexible container in the pressure vessel in longitudinal section during filling.

FIG. 3 shows the pressure vessel 1 with the installed flexible filtration container during the filling of the flexible filtration container 8 with suspension. The discharge connection 14 of the flexible container 8 is led through the outlet nozzle 6 and seals the inner pressure vessel zone 2 from the outer environment 3. The discharge connection 14 is closed tightly by the closure mechanism 7, which also seals the inner zone of the filtration container from the external environment 3. The two inlet and outlet connections 13', 13" of the filtration container 8 are guided through the inlet and outlet nozzles 5', 5" of the pressure vessel 1 and are also connected to the pressure vessel wall in a sealing manner. The filtrate discharge connection 12 of the filtration container is guided in a similar sealing manner through the filtrate discharge nozzle 5'" of the pressure vessel. In this arrangement, the inner zone 9 of the filtration container is filled with suspension through the inlet connection 13'. At the same time the inner zone 9 can be vented through the outlet connection 13". The suspension consists of a liquid 15 to be filtered with solid materials 16 to be separated. In a broader sense, suspension can also be understood as a gas containing solid materials, wherein the gas to be filtered is represented by the reference numeral 15 and the solid materials to be separated by the numeral 16. During filling, the inner pressure vessel zone 2 is vented through the nozzle 4 and 4", thus the flexible wall of the filtration container 8 can adapt to the contours of the pressure vessel 1 and is supported by it and limited in its further expansion. In a further development of the invention, the flexible filtration container can be installed in an evacuated form and can be expanded and filled by applying a negative pressure in the nozzle 4 and thus between the pressure vessel wall 1 and flexible container 8 (i.e. the inner pressure vessel zone 2).

Figure 4:
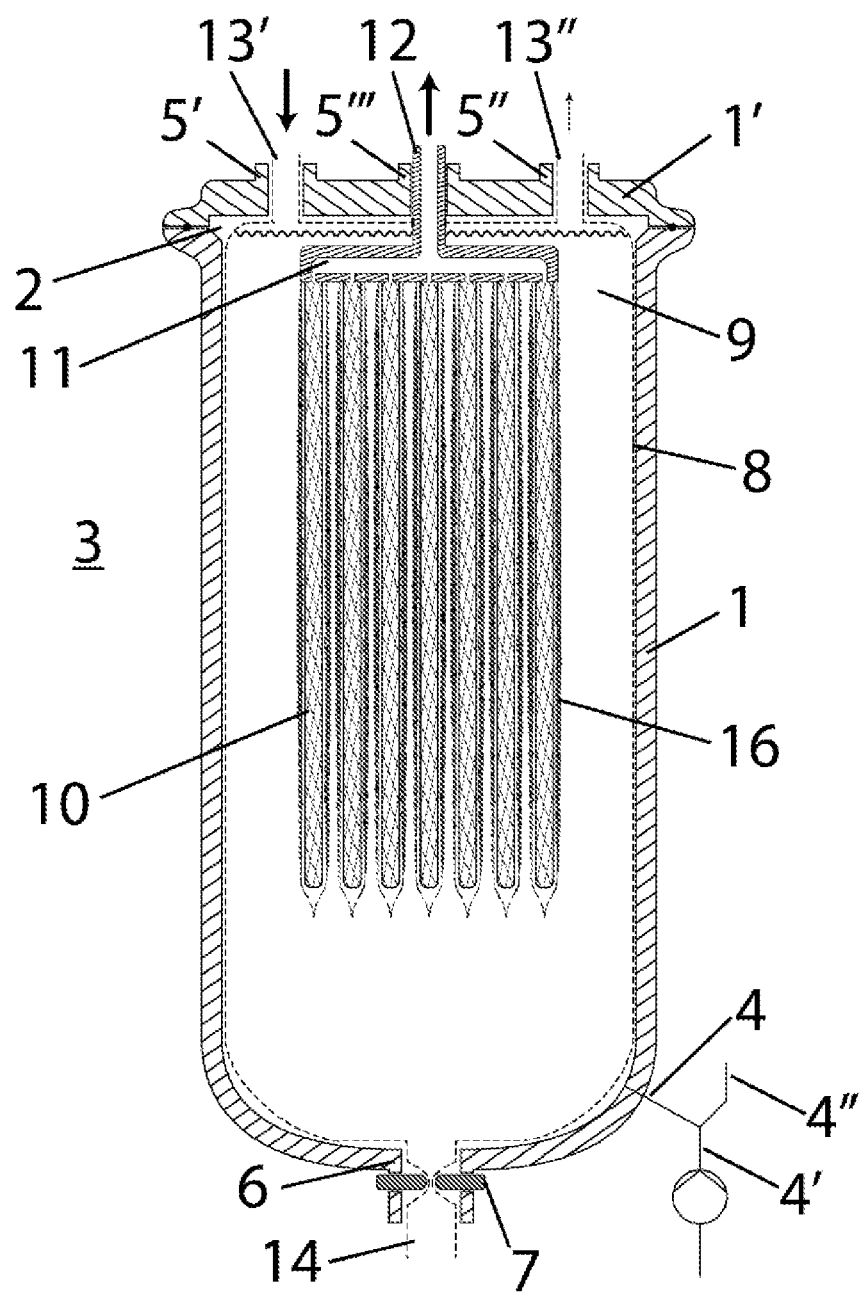
FIG. 4 shows the device with the installed flexible container in the pressure vessel in longitudinal section during filtration.

FIG. 4 shows the actual filtration of the device according to the invention. The suspension is filtered by applying a pressure gradient between the inner area 9 of the filtration container and the filtrate side 12. The pressure gradient is created either by creating an overpressure through the inlet connection 13' into the interior of the container 9 or a negative pressure in the filtrate outlet 12. The filtrate flows through the filter elements 10, is combined in the collector piece 11 and discharged through the filtrate discharge connection 12. The solid matter 16 collects on the filter elements 10. During filtration, the nozzle 13" can be used to discharge suspension or to vent the inner zone 9.

Figure 5:
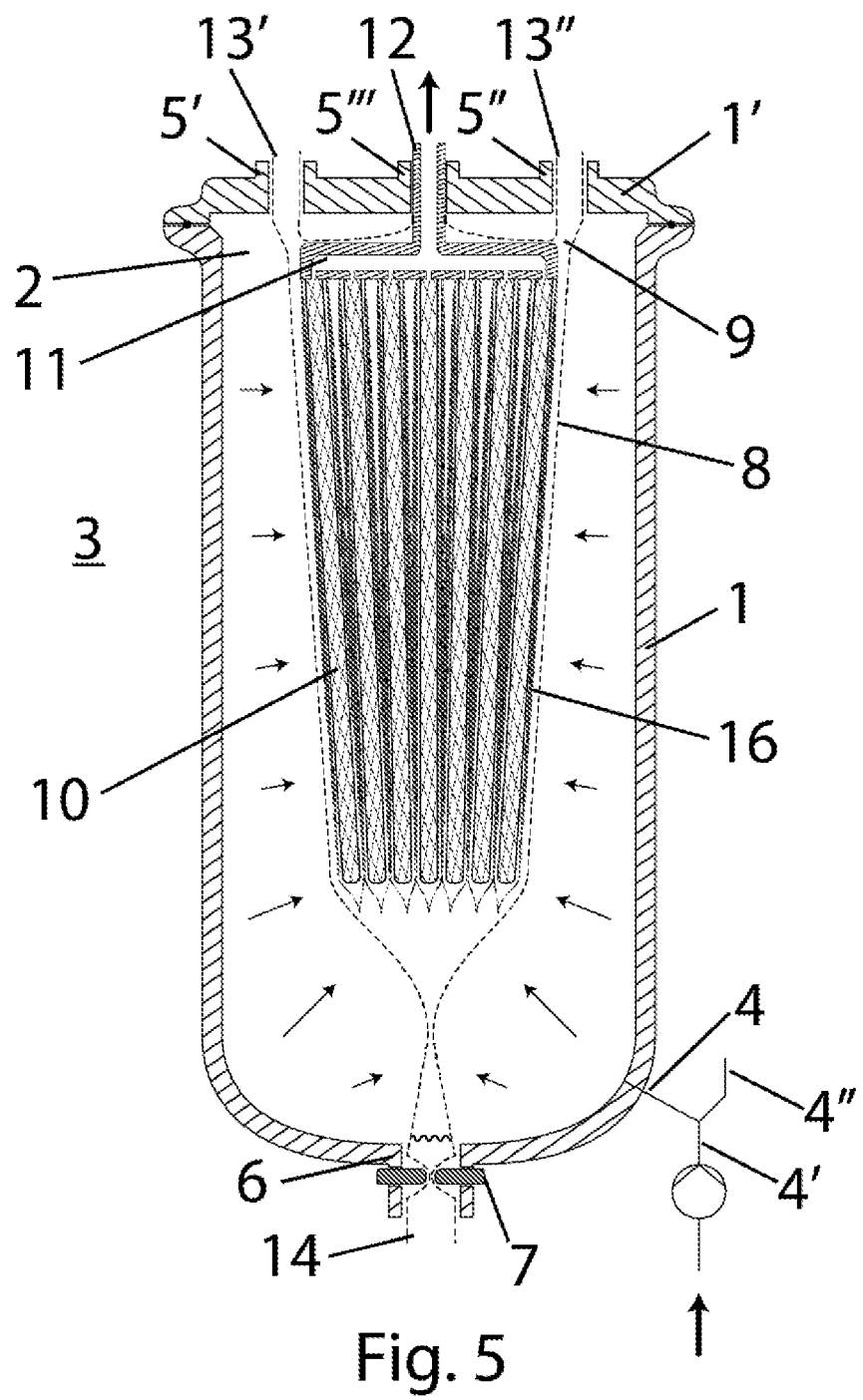
FIG. 5 shows the device with the installed flexible container in the pressure vessel during the compression of the flexible container and the residual volume filtration in longitudinal section.

The continuing residual volume filtration is shown in FIG. 5. An overpressure is introduced into the inner pressure vessel zone 2 through the nozzles 4 and 4', which compresses the flexible filtration container 8. By opening the filtrate discharge connection 12, further filtrate can be discharged until the filtration container is completely compacted and there is no more liquid inside the filtration container 9. The external force additionally presses out the individual filter elements 10 and the solid material 16 collected on them. This reduces the volumes between the filter elements 10 and within the filter elements themselves, so that any remaining suspension in these volumes can be better removed. In a further development of the invention, the solid material 16 can now be washed and/or dried with additional rinsing liquids or gases introduced through the connections 13' or 13". In a further development of the invention, the suspension can be discharged through the connections 13' and 13" while the flexible container 8 is being pressed together.

Figure 6:
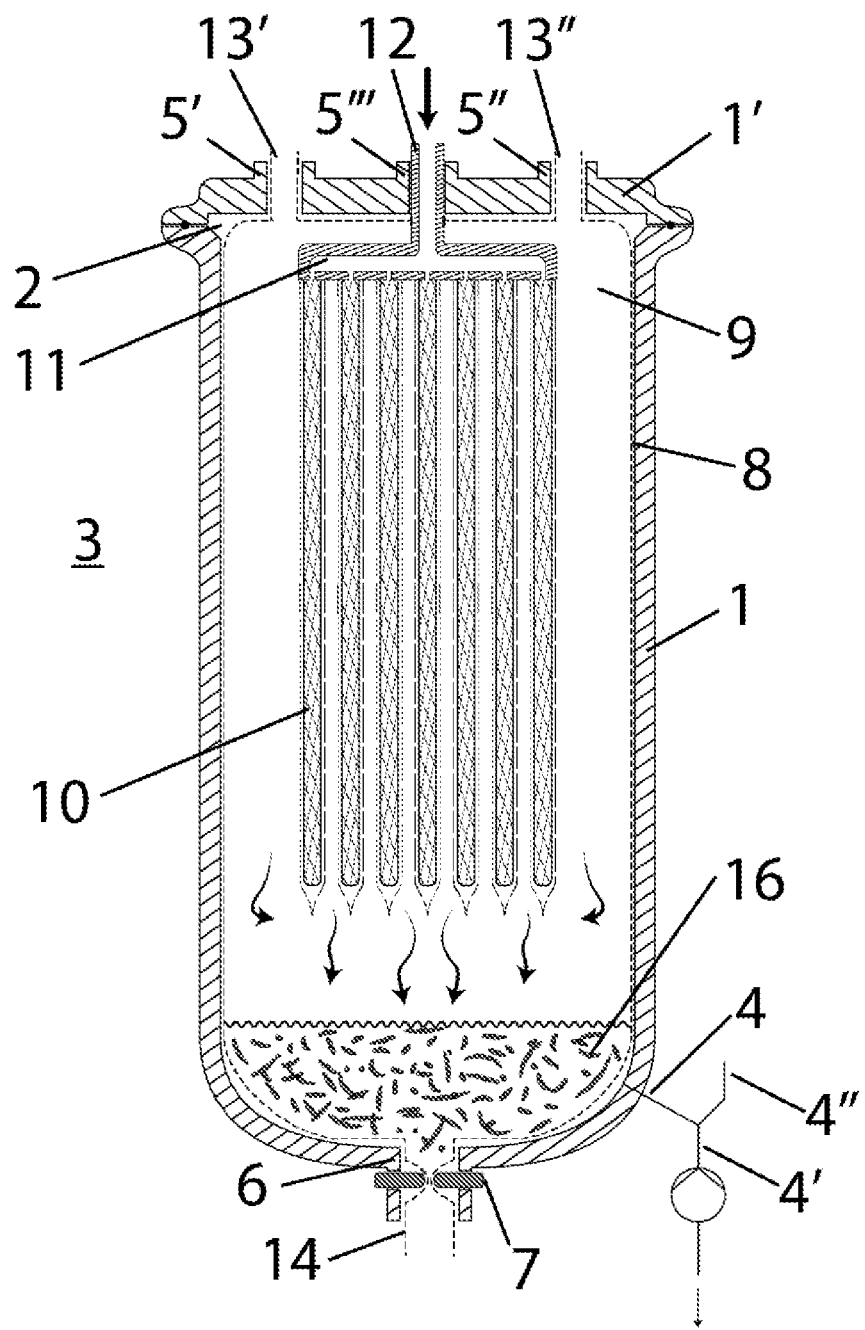
FIG. 6 shows the device with the installed flexible container in the pressure vessel during backwashing of the filter elements and removal of the solid materials in longitudinal section.
Figure 7:
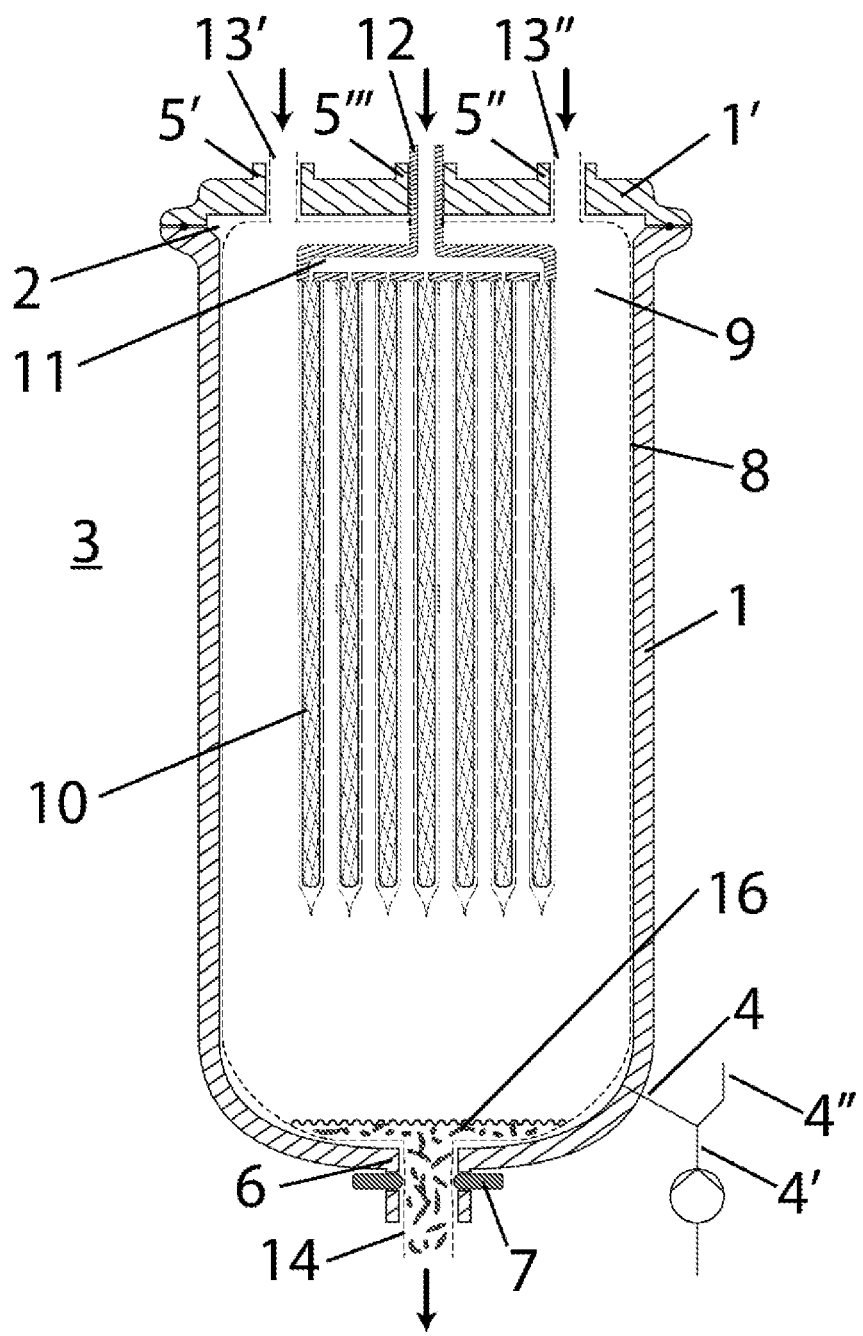
FIG. 7 shows the device with the installed flexible container in the pressure vessel during the solid materials discharge and regeneration of the filter elements in longitudinal section.

FIG. 6 shows the regeneration of the filter elements 10 by rinsing the solid material 16. By backwashing the filter elements against the direction of filtration, the solid material 16 can be detached from the filter elements 10. For this purpose, filtrate, rinsing liquid or a gas is introduced into the inner zone 9 of the flexible container 8 through the filtrate discharge connection 12 and the filter elements 10. The solid matter 16 is blasted off, the filter elements 10 are now free again. In a further development, the filtration cycle can now be continued from the beginning (FIG. 3) or the concentrated solid can be emptied in the next step (FIG. 7). In a further development of the invention, the solid material can additionally be rinsed by introducing liquid or gas through the connections 13', 13". In a further development of the invention, backwashing can also be carried out in the filled state without the residual volume filtration (FIG. 5). In this case, the solid material 16 is rinsed by the filter elements 10, thus releasing them for a new filtration.

FIG. 7 shows the discharge of the dry or concentrated solid material 16 or the remaining suspension. The closure mechanism 7 is opened and the solid material 16 or the residual liquid can escape through the discharge connection 14. In addition, the interior 9 of the filtration container and the filter elements 10 can be flushed by introducing liquid or gases through the connections 12, 13' or 13".

Figure 8:
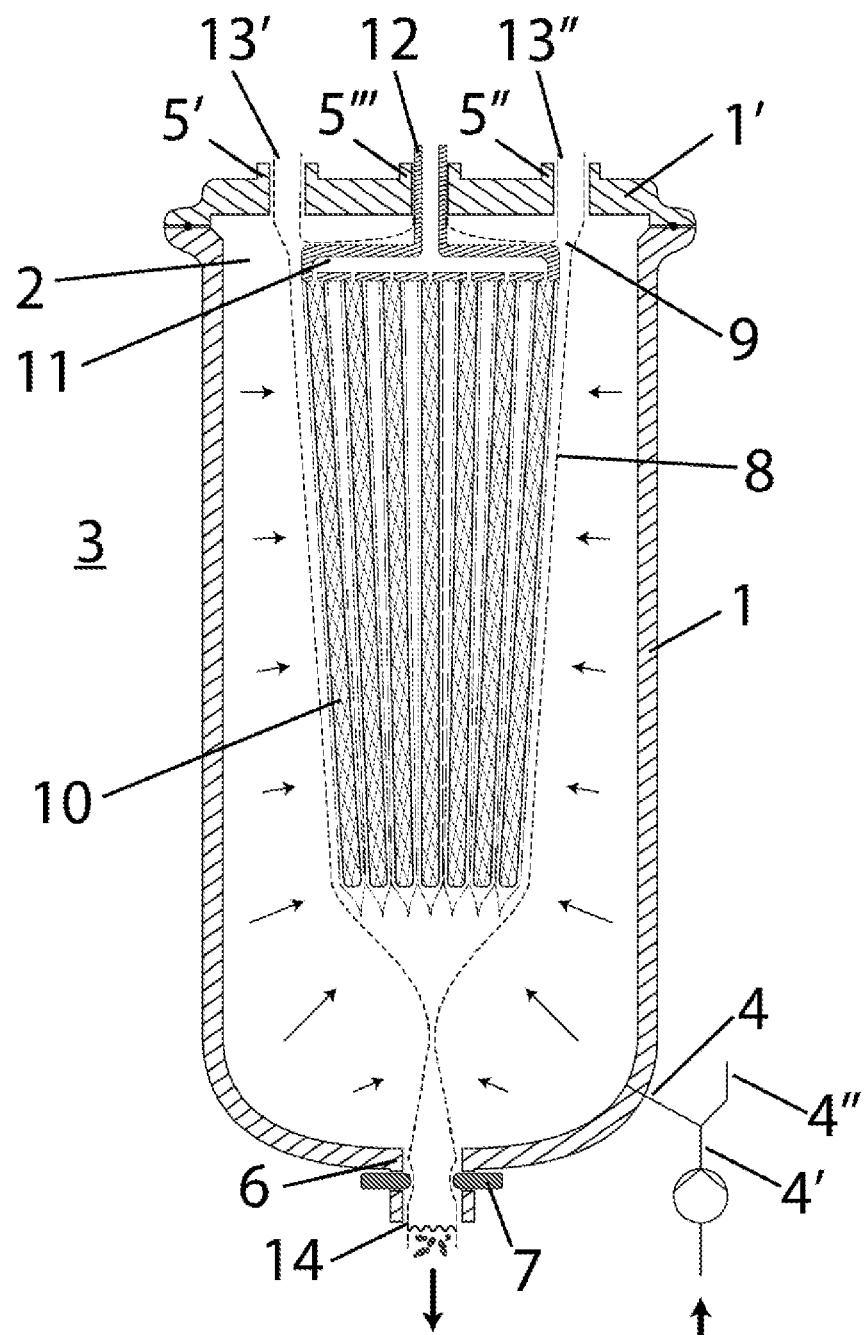
FIG. 8 shows the device with the installed flexible container in the pressure vessel during the compression of the flexible container and the discharge of solid materials in longitudinal section.

In FIG. 8, the flexible filtration container is pressed out by applying pressure in the inner pressure vessel zone 2. Last residues of solid material 16, suspension or flushing liquid can be discharged through the discharge connection 14. The flexible filtration container is now completely emptied and evacuated and can now be removed from the pressure vessel 1 or used for refilling and subsequent filtration.

Figure 9:
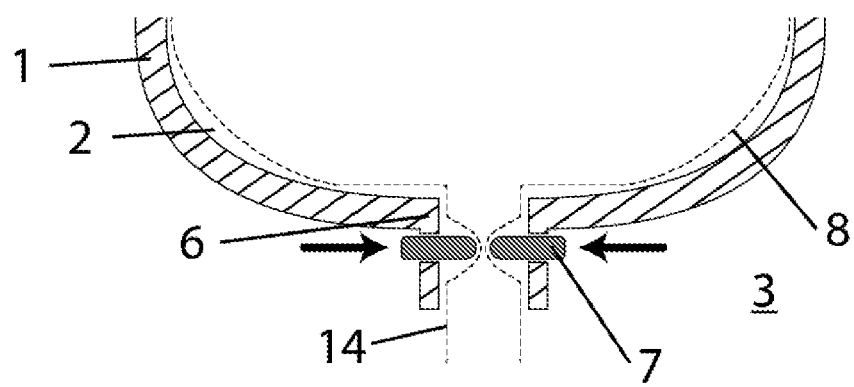
FIG. 9 shows a section of the device with the closure mechanism in a variant with a sealing clamping device in longitudinal section.
Figure 10:
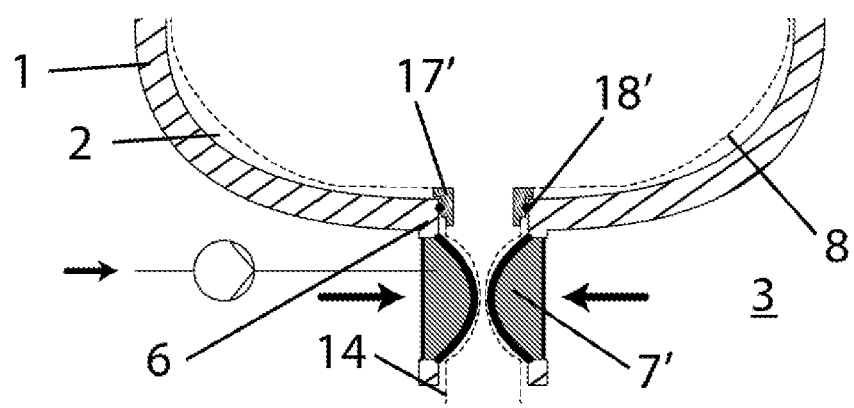
FIG. 10 shows a section of the device with the closure mechanism in a variant with pressure-operated valve and additional sealing of the discharge outlet on the flexible container in longitudinal section.
Figure 11:
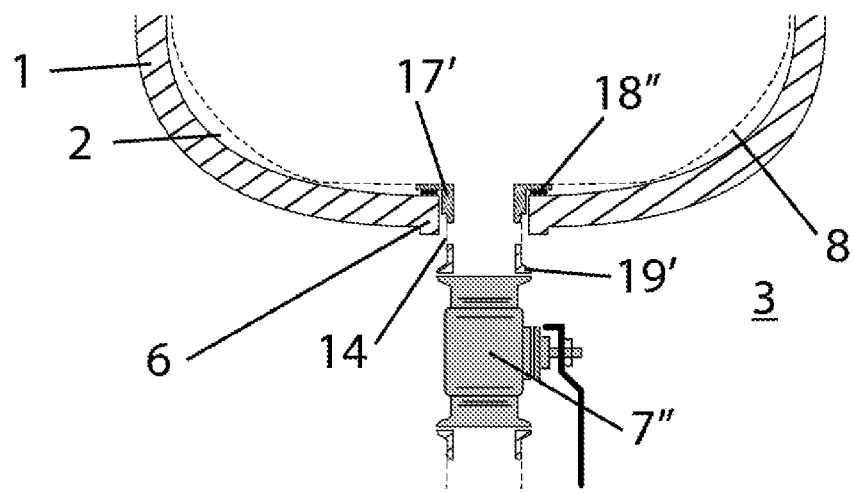
FIG. 11 shows a section of the device with the closure mechanism in a variant with manual valve and additional sealing of the discharge outlet on the flexible container in longitudinal section.
Figure 12A:
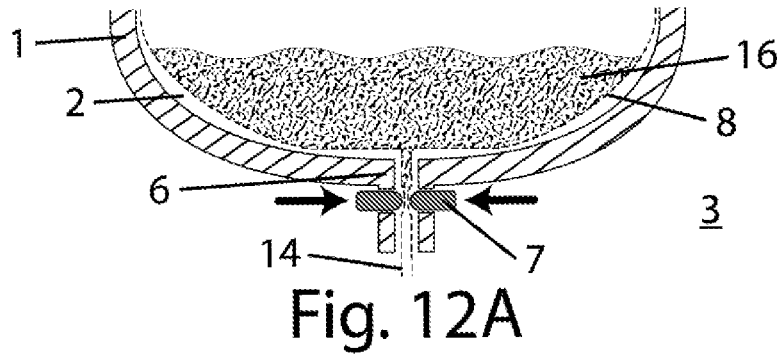
FIGS. 12A-D show a section of the device with the closure mechanism in various sizes in closed state in longitudinal section.
Figure 12B:
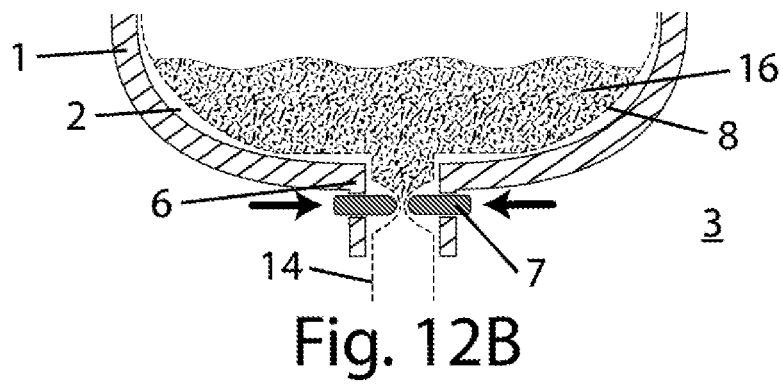
Figure 12C:
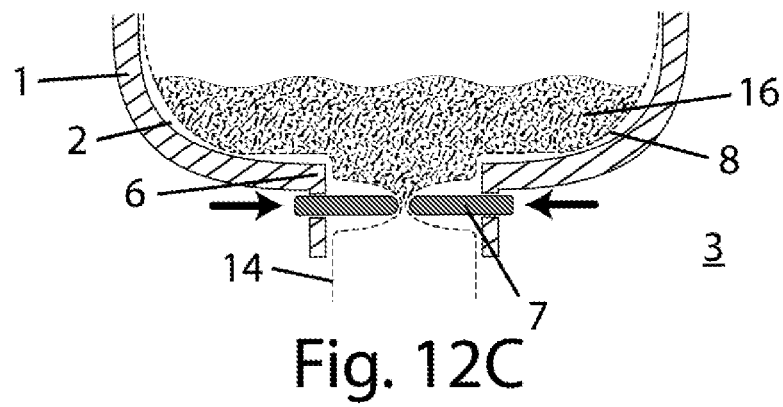
Figure 12D:
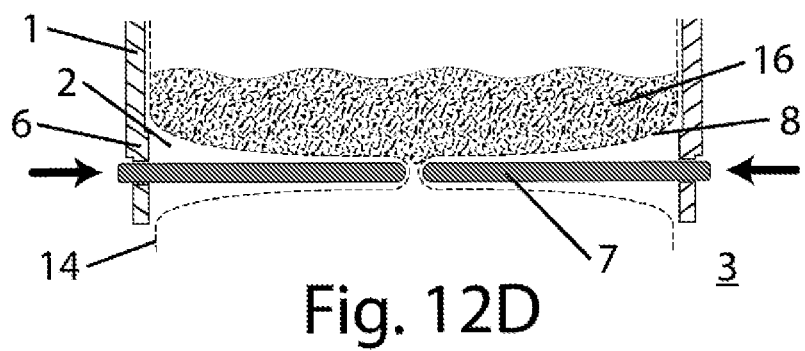
Figure 13A:
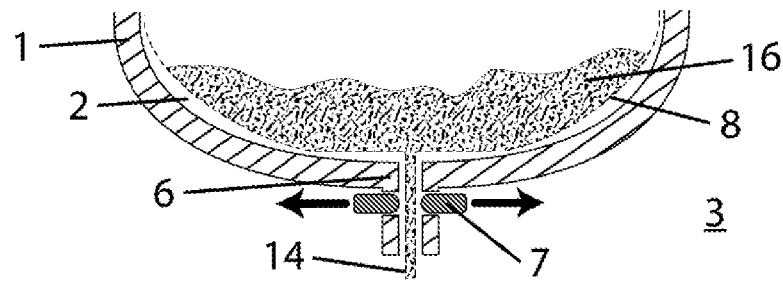
FIGS. 13A-D show a section of the device with the closure mechanism in various sizes in open state in longitudinal section.
Figure 13B:
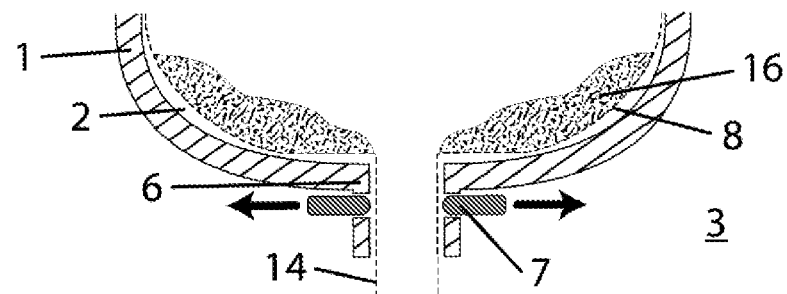
Figure 13C:
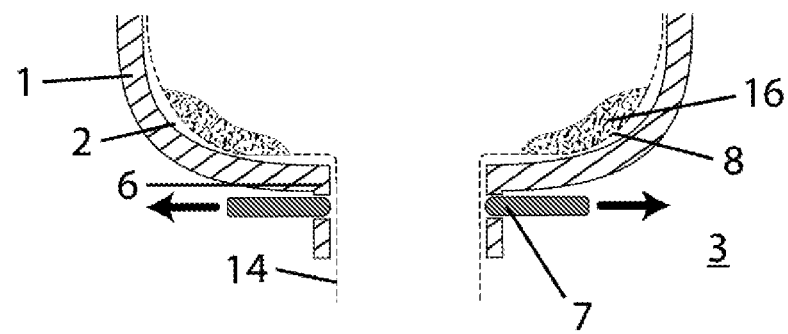
Figure 13D:

FIGS. 9-11 show different embodiments of the closure mechanism 7 and the sealing of the inner pressure vessel zone 2 from the environment 3. The illustrated approaches are examples and can be carried out in any combination.

FIG. 9 shows the pressure vessel 1. The flexible container 8 is equipped with an extension 14. In one embodiment, this extension 14 is made of the same material as the flexible container 8, for example flexible plastic multi-layer film. In one wall of the pressure vessel 1 there is a lead-through 6. This is preferably located in the lower area. The flexible container 8 is installed in the pressure vessel 1, wherein the extension 14 is brought through the outlet 6 for discharging the solid materials. Following the discharge outlet 6, there is a closure mechanism 7, preferably a clamping device, preferably a pinch valve, which allows the extension 14 of the filtration container to be closed tightly without coming into direct contact with the solid materials or suspension inside the container. The closure mechanism also seals the inner pressure vessel zone 2 from the environment 3, at least in closed condition, preferably also in open condition.

FIG. 10 shows another embodiment of the discharge mechanism with the closure mechanism. A connecting piece 17' is sealingly attached to the flexible wall of the flexible container and is inserted into the discharge outlet 6 of the pressure vessel 1 when the flexible container is installed. A seal 18', shown here as an O-ring, is used to seal the inner pressure vessel zone 2 from the environment 3. The extension 14, consisting of a film tube or a flexible tube material, e.g. silicone, is sealingly connected to the connecting piece 17' and passes through a subsequent clamping device 7'. As a further example, this is represented by a membrane body, which applies a pressing force to the extension 14 by applying pressure and closes it. Here too, direct contact between the valve and the solid or liquid in the flexible container is prevented, which has advantages for sterile operation.

FIG. 11 shows another variant with a flat seal 18" as a seal for the connecting piece 17' to the pressure vessel 1. The extension 14 of the flexible container 8 is provided with another connection 19' at its end, which can be connected to a valve 7", for example to a ball valve.

FIGS. 12 and 13 show variants of the invention with a closure mechanism 7 in different sizes in closed (FIGS. 12A-D) as well as in open condition (FIGS. 13A-D). In applications with coarse solid materials or solid sludge 16 and especially with very dry solid materials, discharge is difficult, especially if the outlet for discharging the solid materials 6 or the discharge connection 14 has a very small opening. If the discharge diameter is too small, there is a risk that the solid material or solid sludge 16 will flow off unfavourably or not at all or that the discharge connection 14 will become blocked. Therefore, a diameter adapted to the solid material must be selected for the outlet nozzle 6, the closure mechanism 7, as well as for the discharge connection 14 (in open condition).

Figure 14A:
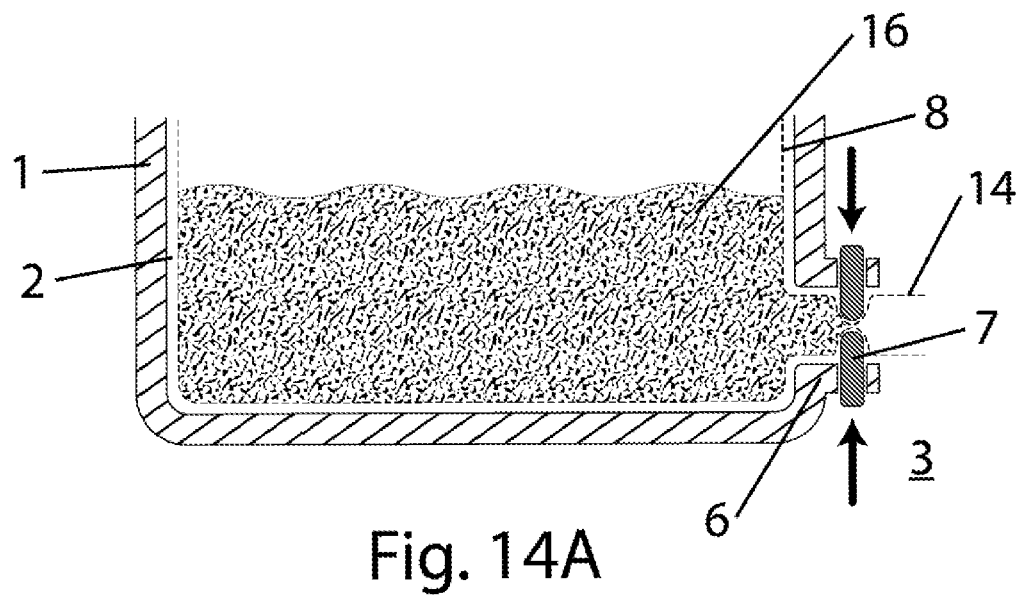
FIGS. 14A-B show a section of the device with the closure mechanism with discharge nozzle in the lateral lower part of the pressure vessel in longitudinal section.
Figure 14B:
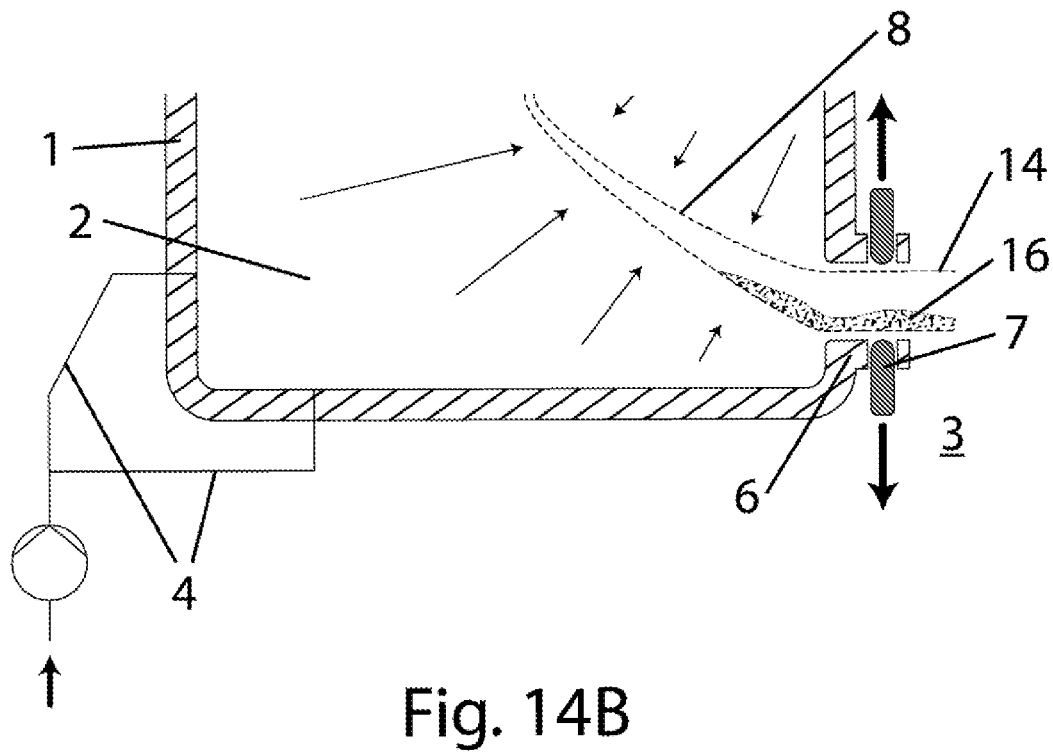

FIG. 14A shows a variant of the invention with lateral outlet 6 for discharging solid materials and discharge connection 14. Solid materials 16 are discharged by opening the closure mechanism 7 (FIG. 14B). In addition, the flexible container 8 can be compressed by applying pressure in zone 2 through connection 4, which favours the complete discharge of the solid material or solid sludge 16.

LIST OF REFERENCE NUMERALS

1 Pressure vessel
1' Lid of the pressure vessel
2 Pressure vessel zone
3 Environment
4 Pressure line
4' Compressed air supply
4" Vacuum supply
5' Inlet nozzle
5" Outlet nozzle
5'" Filtrate discharge nozzle
6 Outlet for discharging solid materials, discharge outlet, discharge nozzle
7 Closure mechanism
7' Clamping device, pinch valve
7" Valve
8 Flexible container
8' Connection of filtrate discharge connection to the flexible container
9 Inner zone of the flexible container
10 Filter element
11 Collection piece
12 Filtrate discharge connection
13' Inlet connection
13" Outlet connection
14 Extension, discharge connection
15 Liquid or gas, filtrate
16 Solid material
17' Connecting piece
18' O-Ring
18" Flat seal
19' Valve connection

What is claimed is:

1. A device for separating solid materials from liquids or gases, comprising a pressure vessel, having at least one inlet nozzle for an inlet connection, at least one filtrate discharge nozzle for a filtrate discharge connection, and a plurality of filter elements, wherein the filter elements are arranged side by side and parallel next to one another and are connected to one another to form a filter package, wherein there is a free space between the individual filter elements over a large part of their vertical longitudinal extension, and wherein the filter elements are arranged in a flexible container which is arranged in the pressure vessel and is sealed tightly relative thereto, wherein the pressure vessel comprises at least one outlet for the discharge of solid material and the flexible container comprises at least one discharge connection, wherein each said at least one discharge connection of the flexible container is guided through a corresponding outlet of the pressure vessel and is sealed tightly relative to the pressure vessel, wherein the outlet and said at least one discharge connection of the flexible container can be sealed tightly relative to an environment outside the flexible container and the pressure vessel by means of a closure mechanism, wherein the filter elements are arranged in a suspended position and are designed in such a way that they can be pressed together to empty the flexible container, wherein a sealed pressure vessel zone is located inside the pressure vessel between an inner wall of the pressure vessel and an outer wall of the flexible container, and wherein a pressure line is attached to the pressure vessel in order to introduce an overpressure in the pressure vessel zone inside the pressure vessel in order to compress the flexible container and to compress the filter elements in the flexible container.

2. The device according to claim 1, wherein the closure mechanism is a clamping device.

3. The device according to claim 1, wherein the closure mechanism is a pinch valve.

4. The device according to claim 1, wherein the at least one discharge connection of the flexible container is sealed tightly relative to the outlet of the pressure vessel by means of a seal.

5. The device according to claim 4, wherein the seal is an O-ring or a flat seal.

6. The device according to claim 1, wherein the diameter of the outlet for discharging solid material is at least 15 mm.

7. The device according to claim 6, wherein the diameter of the outlet for discharging solid material is the same as the diameter of the pressure vessel.

8. The device according to claim 1, wherein the filter elements that are arranged parallel to one another are each of flat design.

9. The device according to claim 1, wherein the filter elements are of round design.

10. The device according to claim 1, wherein the flexible container is removable from the pressure vessel.

11. The device according to claim 1, wherein the at least one outlet for discharging solid material and the at least one discharge connection of the flexible container are arranged in the lower region of the pressure vessel and the flexible container.

12. The device according to claim 1, wherein the flexible container can be compressed by an external pressure.

13. The device according to claim 1, wherein the flexible container has inlet and outlet connections, and the inlet and outlet connections are provided with a tube inside the flexible container.

14. The device according to claim 13, wherein an end of the tube on the flexible container is provided with a nozzle.

15. A method for the filtration of solid materials from liquids or gases and for discharging the solid material by means of the device according to claim 1, comprising the steps of:
 a) applying a pressure difference between an interior of the flexible container and the filtrate discharge connection,
 b) filling the flexible container with a suspension or gas,
 c) applying a negative pressure in the filtrate discharge or an overpressure in the flexible container,
 d) pressing out the flexible container,
 e) flushing the solid material with flushing liquids or gases through the inlet connection,
 f) rinsing the solid material from the filter elements through the filtrate discharge connection for the regeneration of the filter elements for the next cycle, and
 g) opening the closure mechanism and discharging the solid material through the discharge connection of the flexible container at the outlet of the pressure vessel.

16. The method according to claim 15, wherein steps a) to g) are repeated one or more times.

17. The device according to claim 1, wherein the diameter of the outlet for discharging solid material is at least 20 mm.

18. The device according to claim 1, wherein the diameter of the outlet for discharging solid material is at least 25 mm.

* * * * *